United States Patent [19]

Alm

[11] 4,302,774
[45] Nov. 24, 1981

[54] AMPLITUDE COMPRESSION AND FREQUENCY COMPENSATION SYSTEM

[75] Inventor: Ake W. Alm, San Pedro, Calif.

[73] Assignee: Hughes Aircraft Company, Culver City, Calif.

[21] Appl. No.: 35,769

[22] Filed: May 3, 1979

[51] Int. Cl.³ .............................................. H04N 5/33
[52] U.S. Cl. .................................... 358/113; 307/556; 328/171; 330/145; 330/277; 333/28 R; 358/166
[58] Field of Search ....................... 328/168, 169, 171; 307/237, 264; 333/28 R, 28 T; 179/1 D; 325/62; 330/144, 145, 277, 282, 300, 303, 304; 358/113, 166; 455/72

[56] References Cited

U.S. PATENT DOCUMENTS

| | | | |
|---|---|---|---|
| 3,778,722 | 12/1973 | Stein | 333/28 R |
| 3,898,573 | 8/1975 | Sherman | 328/171 |
| 3,904,975 | 9/1975 | Satoh | 328/171 |
| 3,967,209 | 6/1976 | Skoures et al. | 330/277 |
| 4,038,688 | 7/1977 | Chow et al. | 358/160 |
| 4,085,340 | 4/1978 | Salesky et al. | 307/264 |
| 4,091,414 | 5/1978 | Chow | 358/113 |
| 4,121,183 | 10/1978 | Murphy | 307/237 |
| 4,181,896 | 1/1980 | Schroder | 330/145 |

FOREIGN PATENT DOCUMENTS

2725157 6/1978 Fed. Rep. of Germany ...... 358/160

OTHER PUBLICATIONS

Pogge–Simulate Analog Circuits With Digital Filtering Circuits EDN–Oct. 5, 1976, vol. 21, No. 18, pp. 93-97.

*Primary Examiner*—Joseph A. Orsino, Jr.
*Attorney, Agent, or Firm*—William J. Benman, Jr.; William H. MacAllister

[57] ABSTRACT

A system is disclosed for frequency compensation and amplitude compression of signals from a scene having targets which radiate infrared energy. The system uses at least two combinations, where each combination consists of an operational amplifier and a variable resistance element. These combinations are electrically coupled to each other. A circuit connected to one of the amplifiers provides high frequency compensation for radiated energy by small targets in the infrared scene. The system also utilizes a reference source which is coupled to the input of another of the amplifiers.

5 Claims, 3 Drawing Figures

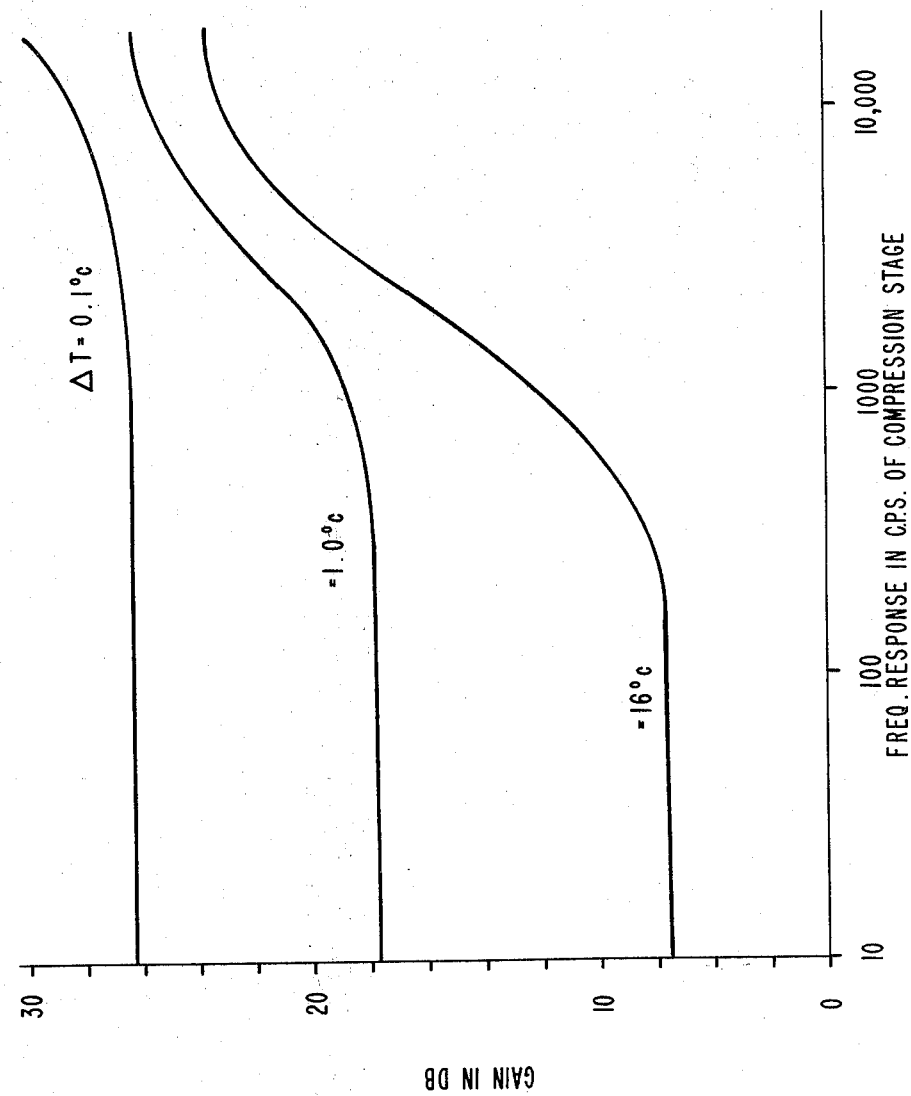

AMPLITUDE COMPRESSION AND FREQUENCY COMPENSATION SYSTEM

TECHNICAL FIELD

This invention is the field of video image displays of signals from infrared sensed targets, and particularly in the field of frequency compensation as well as amplitude compression of such signals to obtain improved image resolution.

BACKGROUND ART

The prior art systems employing video image displays of signals from infrared sensed targets have a number of disadvantages.

One disadvantage consists of a loss of detail in displayed scenes when unusually hot targets of extended size are present.

Another disadvantage of such prior art systems is the need for a manual gain control in order to cover the wide range of infrared signal levels between targets having large temperatures and targets having the smallest possible discernable temperature.

A further disadvantage of such prior art systems is manifested in a multiple target situation wherein large and small temperature radiating targets are simultaneously present in the scene. In such case it is necessary for the operator of the system to manually attenuate the overall scene signals in order to acquire total scene information, and in such instance, information from low temperature target radiations is lost.

SUMMARY OF THE INVENTION

Accordingly, it is an objective of this invention to avoid loss of detail in displayed scenes, including relatively small targets having low infrared radiation energy in the presence of hot targets of extended size.

Another objective of this invention is to eliminate the need of manual gain control in the target acquision system, and for incorporating an automatic gain control and a frequency compensation circuit so that small and large target signals can be received in a weighted relationship to each other.

Still a further objective of this invention is to incorporate an amplitude compression technique so that signal amplitudes may be compressed to approximately half their decibel levels in order to avoid attenuating the signal information comprising signals from different size targets having different heat radiation levels.

Yet a further objective of this invention is to provide automatic attenuation of signals from large temperature radiating targets without substantially attenuating radiation signals from lower temperature radiating targets and thereby avoid loss of information from the low temperature targets and consequently decrease in video resolution of the scene.

In accordance with one preferred embodiment of the subject invention there is provided a system for amplitude compression and frequency compensation of signals from a scene for infrared sensed targets. The system has at least two amplifiers, the output of the last amplifier in the system feeding back the inputs of the first and other amplifiers of the system by means of field effect transistors connected to each amplifier input, one field effect transistor for each amplifier. A rectifier is provided between the output of the first amplifier and the input of the next succeeding amplifier through one of the field effect transistors.

Each of the field effect transistors has a variable resistance characteristic, and such variable resistance characteristic coacts with a frequency compensation circuit connected to the first of the amplifier inputs to compress the amplitudes of all signal components provided at the output of the first of the amplifiers.

The voltage output system is therefore the Nth root function of the input signals from the scene, where N represents the number of combinations of field effect transistors and amplifiers. Consequently, in a system of this type where it is desired to compress a 60 decibel input signal to a 30 decibel signal, the system would require two field effect transistor-amplifier combinations. When it is decided to compress a 90 decibel input signal to a 30 decibel level, the system would require three field effect transistor-amplifier combinations, and so on for higher signal input compression levels.

BRIEF DESCRIPTION OF THE DRAWINGS

FIG. 3 is a graph obtained by similar computations, as for FIG. 2, showing the compressed signal level versus the frequency compensated response for several scene temperature changes.

DETAILED DESCRIPTION OF THE INVENTION

Figure 1:
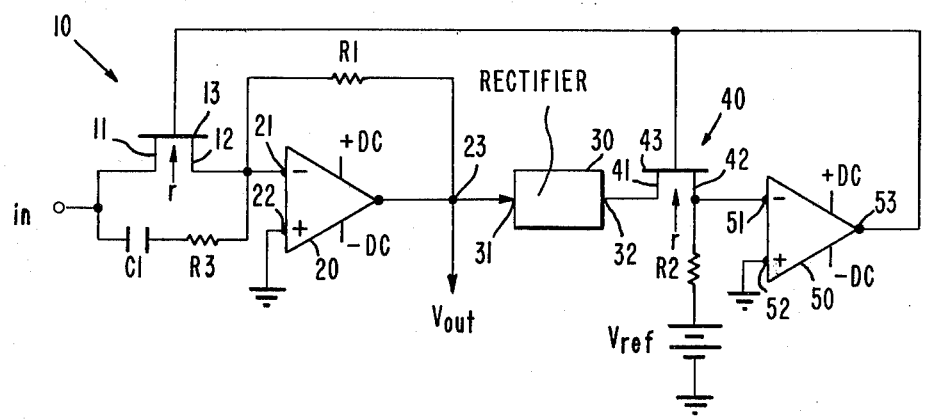
FIG. 1 is a electrical schematic of the amplitude compression and frequency compensation system in accordance with the invention.
Figure 2:
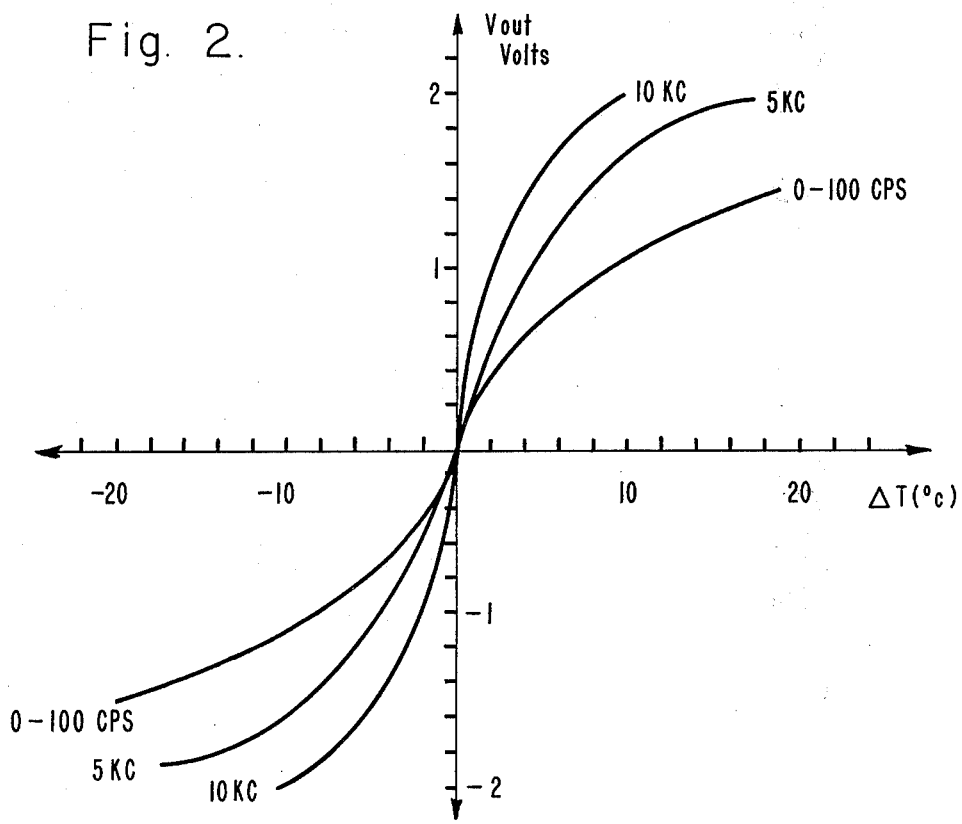
FIG. 2 is a graph of the computed data which utilized a computer program to obtain solutions of the various equations in the specification, wherein the compressed signal output is plotted against scene temperature changes.

Referring to FIGS. 1 through 3 a circuit for compressing the amplitudes of input signals and for compensating for the higher frequency components of such signals is utilized in connection with a video system that displays signals emanating from acquired infrared energy radiating targets.

Compression of the amplitudes of such infrared signals is necessary in order to enable all the data from such targets to be video displayed with improved image detail and at the same time minimize visual streaking effect contributed by unusually hot targets. The compression circuit is so designed so that the voltage output from such circuit is an Nth root function of the input signals.

Accordingly, $V_{in}$ which is representative of the total voltage input into the compression circuit, represents the infrared signals, and $V_{out}$ represents the total voltage output from such circuit, after $V_{in}$ amplitudes have been compressed.

The input terminal of the compression circuit is fed by $V_{in}$ and such input terminal is connected to source element 11 of FET transistor 10. Drain member 12 of transistor 10 is connected to the negative terminal 21 of operational amplifier 20, and the positive terminal 22 of operational amplifier 20 is at ground potential. Such operational amplifier, conventional in the field of electronics, is fed by a DC source having positive and negative polarities.

A high frequency compensating network, which will be also discussed in connection with FIG. 3, consists of capacitor C1 in series with resistor R3. Such network is connected between the input terminal at $V_{in}$ and terminal 21.

The function of such compensation network is to increase the relative amplitudes of the high frequency signal components present in signal $V_{in}$, which high frequency signal components represent small target bodies that may be present in any infrared scene. Without such compensating network, the signals from the small heat radiating targets or bodies would be compressed and therefore lost in the presence of large amplitude signals from the larger heat radiating bodies or targets.

Resistor R1, connected between terminal 21 of amplifier 20 and its output terminal 23, is part of the system constant which includes the ratio of R1/R3 multiplied by $V_{ref}$, as stated in equation (3) below, and sets the gain G of the system as defined in equation (4), below. The compressed output voltage $V_{out}$ is therefore provided between terminal 23 and ground.

A typical full-wave rectifier bridge 30, is fed by $V_{out}$ at its input terminal 31, providing a voltage output at 32. The voltage output at 32, due to full wave rectification action, will have samples of positive voltage outputs responsive to positive and negative temperature variations ($\pm \Delta T$) of the infrared scene. Such voltage-temperature functions are herein referred to as a two-quadrant operation, as illustrated in FIG. 2. FIG. 2 shows three sets of curves representing three frequency groups of signals. One curve shows the response of large targets radiating heat in the low frequency spectrum 0–100 cycles per second, whereas the smaller heat radiating targets are represented by the 5 and 10 kilocycle per second curves.

Output terminal 32 is connected to source element 41 of another FET transistor 40, and drain 42 of transistor 40 is connected to the negative input terminal 51 of operational amplifier 50, the positive input terminal 52 of amplifier 50 being at ground potential. Such operational amplifier is also conventional to the electronic art and is powered by a dual polarity DC source, which may be the same DC source powering amplifier 20.

Terminal 51 of amplifier 50 is connected to a reference source of voltage consisting of resistor R2 in series with the positive terminal of a battery denoted as $V_{ref}$, the negative side of such battery being at ground potential.

The output 53 of amplifier 50 is fed back to both gates 13 and 43 of the FET transistors 10 and 40 respectively. It should be understood that transistors 10 and 40 are a matched pair of transistors wherein their variable resistances between their respective sources and drains, denoted as r, are substantially the same, in that when the resistance r of one transistor changes due to a different applied voltage, the resistance of the other transistor will change substantially in like manner due to such different applied voltage.

The variable resistance characteristic of either FET 10 or 40 may be mathematically stated as:

$$r = \frac{R_2}{V_{ref}} (V_{out}) \quad (1)$$

The gain $G_o$ of amplifier 20, for frequencies in the range 0–100 cycles per second, representing the dominant frequencies emanating from large targets having large heat radiating surfaces, may be seen from computed results graphed in FIG. 3, wherein the gain is graphed as a function of frequency. Such low frequency gain was computed for the relationships:

$$G_o = \frac{V_{out}}{V_{in}} = \frac{R_1}{r} = \frac{R_1}{R_2} \frac{V_{ref}}{V_{out}} \quad (2)$$

The voltage output $V_{out}$, may be expressed as:

$$V_{out} = \sqrt{R_1/R_2 \times V_{ref} \times V_{in}} \quad (3)$$

It should be pointed out that equation (3) is a square root function of $V_{in}$ because only two amplifier-FET combinations are used. A signal input $V_{in}$ will be compressed in amplitude so that $V_{out}$ is a square root function of $V_{in}$, and consequently a 60 decibel signal will be compressed to a 30 decibel level. If the circuit of FIG. 1 were to have an additional stage consisting of another amplifier 20 and FET 10 combination in series with the presently shown amplifier 20 and FET 10, then the voltage at the output of such additional amplifier 20 would be a cube root function of the input voltage. Hence, if the input voltage would be 90 decibels in a circuit having three amplifier-FET stages, the output voltage would be compressed to a 30 decibel level. Accordingly, the voltage compression of the system is a function of the Nth root of $V_{in}$, where N is an integer and is equal to the number of amplifier-FET stage combinations.

Compression to the 30 decibel level is dictated by the quantity of data generally available from infrared targets in a typical scene and the ability of the video system to handle such decibel level.

The higher spatial frequencies, contributed by bodies of lesser heat radiating surfaces or smaller targets, require compensation or boosting, which is achieved by the C1-R3 network, above discussed, and which network is ineffective insofar as frequencies below 100 cycles per second are concerned.

Such high frequency boost circuit is needed in order not to lose the information at such higher spatial frequencies contributed by small radiating bodies in the presence of hot targets. The gain at such high frequencies, taking the compensation network C1-R3 into consideration, may be seen in FIG. 3, wherein at frequencies above 100 cycles per second, the gain is automatically increased by the compensation network for those temperature changes graphed. Such high frequency gain may be stated as:

$$G = \frac{V_{out}}{V_{in}} = \frac{\sqrt{\omega^2 + \left[\frac{1}{(R_3 + r)C_1}\right]^2}}{\sqrt{\omega^2 + \left[\frac{1}{R_3 C_1}\right]^2}} \left[\frac{R_1(R_3 + r)}{rR_3}\right] \quad (4)$$

where r is as defined by equation (1) and $\omega$ is the frequency in radians per second radiated by the hot bodies.

FIG. 3, the input signal $V_{in}$ has been replaced by its equivalent in terms of temperature change $\Delta T$, so that $$V_{in} = K \Delta T \quad (5)$$

where K is a system constant.

When considering the low frequency gain, the general expression for gain may be used as stated by expression (2).

In the situation when the freqencies involved are so high that they may be deemed as approaching infinity, the expression for high frequency gain may be more simply stated as:

$$G_H = \left(\frac{R_1}{R_2}\right)\left(\frac{V_{ref}}{V_{out}}\right) + \frac{R_1}{R_3} \quad (6)$$

Accordingly, the C1-R3 circuit provides low frequency gain limiting as well as boosting the high frequency gain which can be varied by changing the value of R3.

PROGRAMMED COMPUTATION

Referring to the computer program and listings of computed data, below, the computer program used BASIC language as shown in tabular form below. Such program enabled computation of data based on the mathematically stated equations. The data provided for solution of gain G as stated in equation (4), variable resistance r as stated in equation (1), $\Delta T$ as defined by equation (5) and $V_{out}$ as defined by equations (1), (2), (3) and (4).

The computed data for these parameters are functions of frequency $\omega$ including the condition when $\omega = 0$. A computer program was necessary in order to solve these system parameters which interrelate with each other in a complex way. For example, resistance r is defined in the equations in terms of the ratio of $V_{out}/V_{ref}$, which ratio contains r, and the interative process for different frequencies, which the computer can perform, enables the solutions for r to be obtained.

The instructions to the IBM-360 computer included modification of the computer program to accomodate various values of C1. The response characteristics graphed in FIGS. 2 and 3 are based on C1=0.1 microfarads.

It was only necessary to compute positive values of $\Delta T$ and $V_{out}$ to enable graphing FIG. 2 inasmuch as the negative quadrant of FIG. 2 is a mirror image of the positive quadrant of such figure.

It should be noted that positive and negative value of $\Delta T$ are in terms of temperature deviations from 300 degrees Kelvin. So that any temperature above 300 degrees would be a $+\Delta T$ and any temperature below 300 degrees would represent a $-\Delta T$.

Computer Program - BASIC Language

```
OLD FILE NAME--SQRT4
READY
LIST

SQRT4

5 PRINT "C= 0.5UF"
6 PRINT
10 PRINT "FREQ","GAIN(DB)","R","DELT","VOUT"
21 READ F
22 FOR V0=.1 TO 2.1 STEP .2
30 LET A1=10
40 LET R1=300
50 LET V1=.1
60 LET R3=2000
70 LET R2=4000
80 LET C1=5E-7
90 LET R4=2E6
96 LET R=V0*R3/(A1*V1)
100 LET W1=1/((R1+R)*C1)
110 LET W2=1/(R1*C1)
130 LET G= SQR(W^2+W1^2)/SQR(W^2+W2^2)*R2*((1/R)+(1/R1))
131 LET G1=20*LOG(G)/2.3225S
140 LET W=6.28*F
150 LET D1=V0/(R4*A1*G*2E-9)
160 PRINT F,G1,R,D1,V0
161 NEXT V0
162 GO TO 21
165 DATA 0,100,200,500,1E3,2E3,5E3,10E3,20E3
190 END
READY

RUN

SQRT4
```

Computed Data for C1=0.1 microfarads

```
STOP
0.544 SEC. 39 I/O
READY

5 PRINT "C=0.1UF"
80 LET C1=1E-7
RUN

SQRT4

C=0.1UF
```

| FREQ | GAIN(DB) | R | DELT | VOUT |
|---|---|---|---|---|
| 0 | 26.4443 | 200 | 0.119048 | 0.1 |
| 0 | 17.6921 | 600 | 0.978261 | 0.3 |
| 0 | 13.9794 | 1000 | 2.5 | 0.5 |
| 0 | 11.7253 | 1400 | 4.53794 | 0.7 |
| 0 | 10.1631 | 1800. | 6.98276 | 0.9 |
| 0 | 8.99936 | 2200. | 9.75836 | 1.1 |
| 0 | 8.09139 | 2600. | 12.803 | 1.3 |
| 0 | 7.35952 | 3000. | 16.0714 | 1.5 |
| 0 | 6.75504 | 3400. | 19.527 | 1.7 |
| 0 | 6.24621 | 3800. | 23.141 | 1.9 |
| 0 | 5.81129 | 4200. | 26.8902 | 2.1 |
| 100 | 26.4443 | 200 | 0.119048 | 0.1 |
| 100 | 17.7028 | 600 | 0.977056 | 0.3 |
| 100 | 14.0012 | 1000 | 2.49372 | 0.5 |
| 100 | 11.7606 | 1400 | 4.51861 | 0.7 |
| 100 | 10.2137 | 1800. | 6.94216 | 0.9 |
| 100 | 9.06674 | 2200. | 9.68267 | 1.1 |
| 100 | 8.17661 | 2600. | 12.678 | 1.3 |
| 100 | 7.46345 | 3000. | 15.8803 | 1.5 |
| 100 | 6.87839 | 3400. | 19.2517 | 1.7 |
| 100 | 6.39948 | 3800. | 22.7624 | 1.9 |
| 100 | 5.97489 | 4200. | 26.3885 | 2.1 |
| 200 | 26.4469 | 200 | 0.119012 | 0.1 |
| 200 | 17.7347 | 600 | 0.973474 | 0.3 |
| 200 | 14.066 | 1000 | 2.4752 | 0.5 |
| 200 | 11.8645 | 1400 | 4.46488 | 0.7 |
| 200 | 10.3613 | 1800. | 6.82523 | 0.9 |
| 200 | 9.26098 | 2200. | 9.46853 | 1.1 |
| 200 | 8.41947 | 2600. | 12.3285 | 1.3 |
| 200 | 7.75597 | 3000. | 15.3544 | 1.5 |
| 200 | 7.22087 | 3400. | 18.5074 | 1.7 |
| 200 | 6.78171 | 3800. | 21.7574 | 1.9 |
| 200 | 6.4162 | 4200. | 25.0812 | 2.1 |
| 500 | 26.4547 | 200 | 0.118905 | 0.1 |
| 500 | 17.9495 | 600 | 0.9497 | 0.3 |
| 500 | 14.4877 | 1000 | 2.35788 | 0.5 |
| 500 | 12.5154 | 1400 | 4.14255 | 0.7 |
| 500 | 11.2461 | 1800. | 6.16418 | 0.9 |
| 500 | 10.3736 | 2200. | 8.3321 | 1.1 |
| 500 | 9.74717 | 2600. | 10.5809 | 1.3 |
| 500 | 9.28258 | 3000. | 12.8796 | 1.5 |
| 500 | 8.92905 | 3400. | 15.2032 | 1.7 |
| 500 | 8.6542 | 3800. | 17.5381 | 1.9 |
| 500 | 8.43654 | 4200. | 19.8761 | 2.1 |

| | | | | |
|---|---|---|---|---|
| 1000 | 26.5025 | 200 | 0.118171 | 0.1 |
| 1000 | 18.6143 | 600 | 0.879721 | 0.3 |
| 1000 | 15.6701 | 1000 | 2.0578 | 0.5 |
| 1000 | 14.1636 | 1400 | 3.42656 | 0.7 |
| 1000 | 13.2821 | 1800 | 4.87611 | 0.9 |
| 1000 | 12.7215 | 2200 | 6.35736 | 1.1 |
| 1000 | 12.3424 | 2600 | 7.84801 | 1.3 |
| 1000 | 12.0737 | 3000 | 9.33991 | 1.5 |
| 1000 | 11.8759 | 3400 | 10.8291 | 1.7 |
| 1000 | 11.7256 | 3800 | 12.3144 | 1.9 |
| 1000 | 11.6085 | 4200 | 13.7954 | 2.1 |
| 2000 | 26.6892 | 200 | 0.115739 | 0.1 |
| 2000 | 20.3535 | 600 | 0.720089 | 0.3 |
| 2000 | 18.2411 | 1000 | 1.53057 | 0.5 |
| 2000 | 17.271 | 1400 | 2.396 | 0.7 |
| 2000 | 16.7339 | 1800 | 3.27709 | 0.9 |
| 2000 | 16.3998 | 2200 | 4.16238 | 1.1 |
| 2000 | 16.1747 | 2600 | 5.04829 | 1.3 |
| 2000 | 16.0141 | 3000 | 5.93369 | 1.5 |
| 2000 | 15.8943 | 3400 | 6.81826 | 1.7 |
| 2000 | 15.8018 | 3800 | 7.70198 | 1.9 |
| 2000 | 15.7284 | 4200 | 8.58492 | 2.1 |
| 5000 | 27.2722 | 200 | 0.108225 | 0.1 |
| 5000 | 23.8328 | 600 | 0.482411 | 0.3 |
| 5000 | 22.4355 | 1000 | 0.944351 | 0.5 |
| 5000 | 21.7943 | 1400 | 1.42338 | 0.7 |
| 5000 | 21.4289 | 1800 | 1.9087 | 0.9 |
| 5000 | 21.1936 | 2200 | 2.39691 | 1.1 |
| 5000 | 21.0297 | 2600 | 2.88667 | 1.3 |
| 5000 | 20.9091 | 3000 | 3.37734 | 1.5 |
| 5000 | 20.8167 | 3400 | 3.86859 | 1.7 |
| 5000 | 20.7436 | 3800 | 4.36023 | 1.9 |
| 5000 | 20.6845 | 4200 | 4.85214 | 2.1 |
| 10000 | 28.9736 | 200 | 8.89723 E-2 | 0.1 |
| 10000 | 25.5476 | 600 | 0.395986 | 0.3 |
| 10000 | 24.3299 | 1000 | 0.761048 | 0.5 |
| 10000 | 23.7297 | 1400 | 1.13907 | 0.7 |
| 10000 | 23.3931 | 1800 | 1.52238 | 0.9 |
| 10000 | 23.1734 | 2200 | 1.90837 | 1.1 |
| 10000 | 23.0187 | 2600 | 2.29587 | 1.3 |
| 10000 | 22.9038 | 3000 | 2.68434 | 1.5 |
| 10000 | 22.8152 | 3400 | 3.07344 | 1.7 |
| 10000 | 22.7448 | 3800 | 3.46298 | 1.9 |
| 10000 | 22.6875 | 4200 | 3.85285 | 2.1 |
| 20000 | 30.0757 | 200 | 7.83721 E-2 | 0.1 |
| 20000 | 26.1952 | 600 | 0.367533 | 0.3 |
| 20000 | 25.0029 | 1000 | 0.702249 | 0.5 |
| 20000 | 24.4365 | 1400 | 1.05025 | 0.7 |
| 20000 | 24.1072 | 1800 | 1.40223 | 0.9 |
| 20000 | 23.8913 | 2200 | 1.75697 | 1.1 |
| 20000 | 23.7389 | 2600 | 2.11319 | 1.3 |
| 20000 | 23.6254 | 3000 | 2.47035 | 1.5 |
| 20000 | 23.5377 | 3400 | 2.82814 | 1.7 |
| 20000 | 23.4679 | 3800 | 3.18637 | 1.9 |
| 20000 | 23.411 | 4200 | 3.54493 | 2.1 |

I claim:

1. A system for frequency compensation and amplitude compression of electrical signals comprising:
    at least two operational amplifiers, the output of the second operational amplifier being coupled to an input of the first operational amplifier and a reference source being coupled to an input of said second operational amplifier;
    a separate field effect transistor in an input path of each amplifier having a source and drain in said input path of each of said operational amplifiers and a gate coupled to the output of said second operational amplifier;
    a rectifier connected between the output of said first amplifier and the source of the field effect transistor in the input path of said second operational amplifier; and
    filter means connected to the input of one of said amplifiers for changing the relative levels of predetermined frequency components of said signals.

2. The system of claim 1 wherein said filter means is a resistive-capacitive network.

3. The system of claim 2 wherein said filter means is connected across the source and drain of one of said field effect transistors.

4. In a system for frequency compensation and amplitude compression of signals from a scene having infrared sensed targets, said system having at least two operational amplifiers, first and second, wherein the output of the first of the amplifiers is electrically coupled to the inputs of said amplifiers, said system having a reference source coupled to the input of said first amplifier, an improvement comprising:
    at least two variable resistance elements, first and second, having substantially the same variable resistance characteristics connected to the inputs of said amplifiers, one of said elements per one of said amplifiers, wherein each of said variable resistance elements is a field effect transistor having a gate, source and drain, whereby the output of the first of the amplifiers is connected to the gates of said field effect transistors and the first field effect transistor has its drain connected to the input of the second amplifier and its source connected to the system's signal input, and the second field effect transistor has its source connected to a fullwave rectifier and its drain connected to the input of said first amplifier;
    said rectifier being connected between the output of said second amplifier and said second variable resistance element, for rectifying the output of the second amplifier, whereby voltage outputs responsive to temperature variations of said signals are provided at the output of one of the amplifiers; and
    filter means, connected to the input of one of the amplifiers.

5. The invention as stated in claim 4, wherein said filter means constitutes a resistive-capacitive network connected across the source and drain of said second field effect transistor.

* * * * *